Patented Aug. 18, 1925.

1,550,075

UNITED STATES PATENT OFFICE.

ASA WILLARD JOYCE, OF NEWARK, NEW JERSEY, ASSIGNOR TO THE CHEMICAL FOUNDATION, INCORPORATED, OF NEW YORK, N. Y., A CORPORATION OF DELAWARE.

PREPARATION OF ARYLTHIOGLYCOLLIC ACIDS.

No Drawing.   Application filed July 5, 1924. Serial No. 724,527.

*To all whom it may concern:*

Be it known that I, ASA WILLARD JOYCE, a citizen of the United States, residing at Newark, in the county of Essex and State of New Jersey, have invented certain new and useful Improvements in the Preparation of Arylthioglycollic Acids, of which the following is a full, clear, and exact description, such as will enable others skilled in the art to which it appertains to make and use the same.

The invention relates to a process for the preparation of dye intermediates and more particularly to a process for the production of arylthioglycollic acids.

An object of the invention is to provide a process which is simple and efficient in operation.

A further object of the invention is to provide a process which utilizes substances of low initial cost, thereby rendering such process economical.

Another object of the invention is to provide a process which will produce arylthic glycollic acids in a substantially pure state and which will give good yields.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

In the practice of the invention, there may be prepared intermediates which are utilizable in the manufacture of thio indigoid vat dyes, more particularly arylthioglycollic acids. The process comprises the elimination of the amino group from an ortho amino arylthioglycollic acid with the formation of the corresponding arylthioglycollic acid. This may be accomplished by subjecting a solution of a diazo derivative of an ortho amino arylthioglycollic acid to treatment with an aliphatic alcohol, as mythyl, ethyl, propyl, etc., and a reducing agent, such as a metal of the iron group, for example iron and zinc or stannous chloride, sodium stannite and sodium hydrosulfite. The proportions in which the various constituents may be used are those which correspond to the stoichiometrical requirements, and the temperature at which the reaction is carried out is preferably room temperature, that is about 20° C. When using a metal of the iron group or stannous chloride as the reducing agent, it is preferred to have the reaction take place in the presence of an acid, as sulphuric and phosphoric—whereas, when sodium stannite or sodium hydrosulfite are employed the reaction should take place in an alkaline medium. The yield of the arylthioglycollic acid is good, and the product is substantially pure, it being relatively free from oxy and alkoxy compounds.

As illustrative embodiments of a manner in which the invention may be carried into practice, the following examples are presented. The parts are by weight.

*Example I.*

Take 254 parts of the sodium salt of 5 chloro 3 methyl 2 amino phenyl thioglycollic acid, dissolve in 1,500 parts of water, and mix with a solution containing 75 parts of sodium nitrite in 200 parts of water. The solution thus obtained is added, gradually and with constant stirring, to a mixture of 200 parts of sulphuric acid and 1,000 parts of ice, at such a rate that the temperature will be maintained at or below 10° C. The diazotization having been completed, the reaction mixture is filtered and slowly added to an equal volume of alcohol containing 250 parts of concentrated sulphuric acid and from about 75 to 100 parts of iron, which may be in the form of filings, borings, etc. When the presence of the diazo compound can no longer be detected, a sodium hydroxide solution (40° Bé.) is added until the mixture is slightly alkaline. In order to remove the iron, it is advantageous to add to the alkaline mixture a small quantity of sodium sulfide and to raise the temperature to about 60° to 65° C. The iron is precipitated as the sulfide and may be removed by filtering. The alcohol may be removed from the filtrate by distillation and reclaimed, if it is so desired. The clear liquor obtained is allowed to cool and is then poured into an excess of an acid, such as sulphuric, whereupon the compound 5 chloro 3 methyl phenyl thioglycollic acid precipitates out in the form of small white crystals.

*Example II.*

The process for diazotization as described in Example I is carried out and the product thereof is gradually added to an equal volume of alcohol containing 200 parts of stannous chloride or containing 250 parts of concentrated sulphuric acid and from 140 to 150 parts of granulated zinc. The procedure following the reducing action is as that described in Example I and there results in good yield 5 chloro 3 methyl phenyl thioglycollic acid.

*Example III.*

A diazo solution obtained as described in Example I is made slightly alkaline, for example with sodium carbonate, whereupon it is added to an equal volume of alcohol containing sodium stannite or sodium hydrosulfite. The diazo group is removed and the thioglycollic acid corresponding is obtained.

The process described in the foregoing examples is applicable for the preparation of thioglycollic acids with various aryl groupings, which aryl groupings may be variously substituted. This substitution may be accomplished through the replacement of one or more of the hydrogen atoms in the aryl group by means of a halogen, an alkyl group, and in fact other groupings. For example, in place of the above mentioned sodium salt of 5 chloro 3 methyl 2 amino phenyl thioglycollic acid, there may be used in equivalent quantity the sodium salt of 3 chloro 6 amino phenyl thioglycollic acid, which would yield, as a result of the reaction, 3 chloro phenyl thioglycollic acid.

In its broad aspects, it will be understood the invention comprises a process for the preparation of a thioglycollic acid containing an aryl grouping, which grouping may be variously substituted.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A process for the preparation of arylthioglycollic acids which comprises treating an ortho diazo arylthioglycollic acid with an aliphatic alcohol and a reducing agent.

2. A process for the preparation of arylthioglycollic acids which comprises treating an ortho diazo arylthioglycollic acid with an aliphatic alcohol and a reducing agent in the presence of an acid.

3. A process for the preparation of arylthioglycollic acids which comprises treating an ortho diazo arylthioglycollic acid with an aliphatic alcohol and a reducing agent in the presence of sulphuric acid.

4. A process for the preparation of arylthioglycollic acids which comprises treating an artho diazo arylthioglycollic acid with an aliphatic alcohol and a metal of the iron group.

5. A process for the preparation of arylthioglycollic acids which comprises treating an ortho diazo arylthioglycollic acid with an aliphatic alcohol and iron.

6. A process for the preparation of arylthioglycollic acids which comprises treating an ortho diazo arylthioglycollic acid with an aliphatic alcohol and iron in the presence of an acid.

7. A process for the preparation of arylthioglycollic acids which comprises treating an ortho diazo arylthioglycollic acid with an aliphatic alcohol, iron and sulphuric acid.

8. A process for the preparation of arylthioglycollic acids which comprises treating an ortho diazo arylthioglycollic acid with ethyl alcohol, iron and sulphuric acid.

9. A process for the preparation of 5 chloro 3 methyl phenyl thioglycollic acid which comprises treating a solution containing 5 chloro 3 methyl 2 diazo phenyl thioglycollic acid with an aliphatic alcohol and a reducing agent.

10. A process for the preparation of 5 choro 3 methyl phenyl thioglycollic acid which comprises treating a solution containing 5 chloro 3 methyl 2 diazo phenyl thioglycollic acid with an aliphatic alcohol and iron.

11. A process for the preparation of 5 chloro 3 methyl phenyl thioglycollic acid which comprises treating a solution containing 5 chloro 3 methyl 2 diazo phenyl thioglycollic acid with an aliphatic alcohol and iron in the presence of acid.

12. A process for the preparation of 5 chloro 3 methyl phenyl thioglycollic acid which comprises treating a solution containing 5 chloro 3 methyl 2 diazo phenyl thioglycollic acid with ethyl alcohol, iron and sulphuric acid.

In testimony whereof I affix my signature.

ASA WILLARD JOYCE.